Feb. 24, 1925.
L. K. McCLELLAN
1,527,321
DEMOUNTABLE EMERGENCY AUTOMOBILE TIRE
Filed July 28, 1923      2 Sheets-Sheet 1
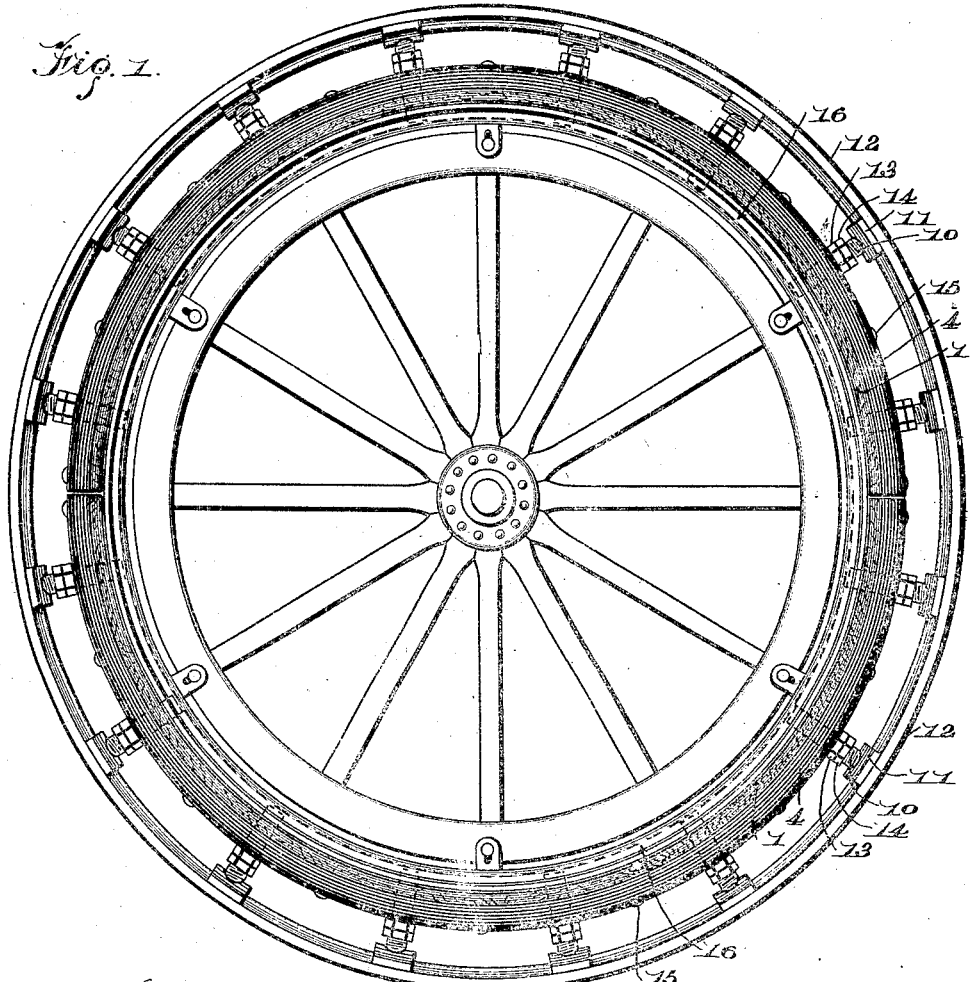
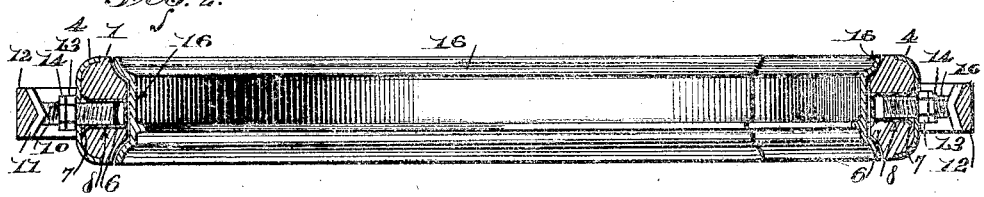
WITNESSES
M. Fowler
J. T. Schrott
INVENTOR
Lewis K. McClellan
BY Munn & Co.
ATTORNEYS Feb. 24, 1925.
L. K. McCLELLAN
1,527,321
DEMOUNTABLE EMERGENCY AUTOMOBILE TIRE
Filed July 28, 1923    2 Sheets-Sheet 2
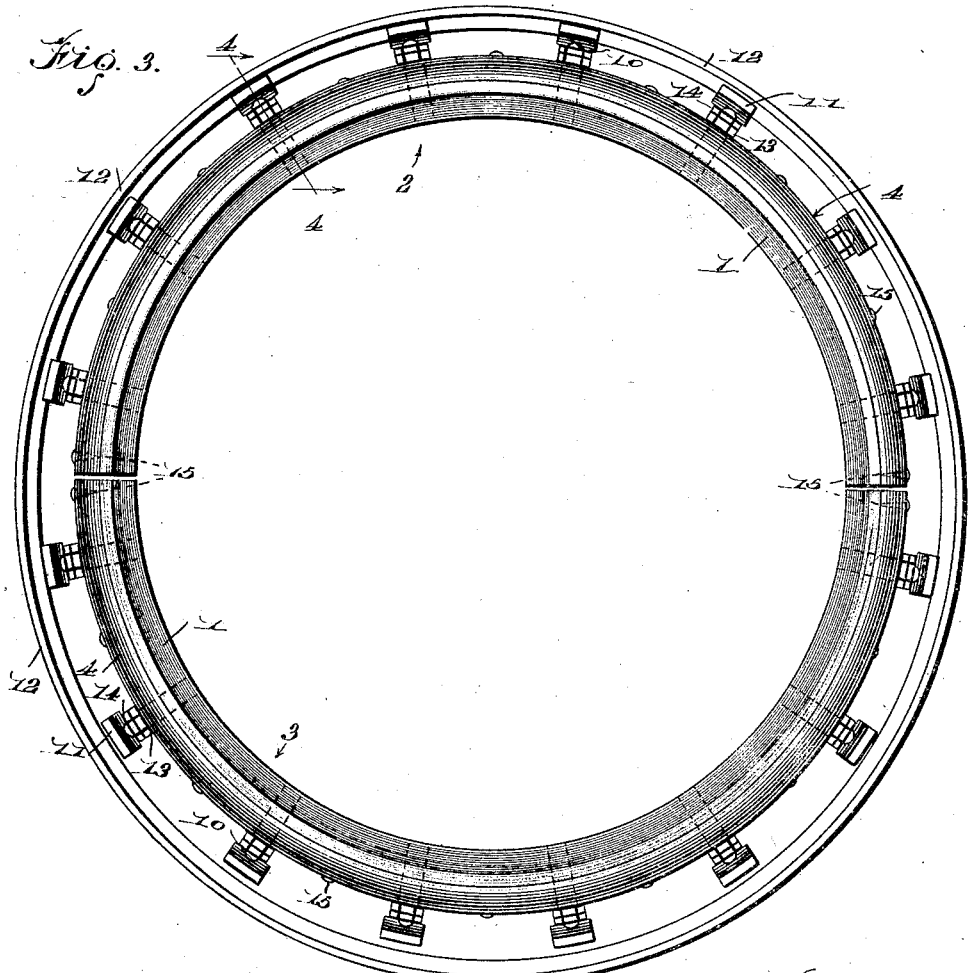
WITNESSES
M Fowler
J. T. Schrott
INVENTOR
Lewis K. McClellan
BY
ATTORNEYS Patented Feb. 24, 1925.

1,527,321

UNITED STATES PATENT OFFICE.

LEWIS KENNETH McCLELLAN, OF BELFREY, MONTANA.

DEMOUNTABLE EMERGENCY AUTOMOBILE TIRE.

Application filed July 28, 1923. Serial No. 654,420.

*To all whom it may concern:*

Be it known that I, LEWIS KENNETH MC-CLELLAN, a citizen of the United States, and a resident of Belfrey, in the county of Carbon and State of Montana, have invented certain new and useful Improvements in Demountable Emergency Automobile Tires, of which the following is a specification.

My invention relates to improvements in automobile tires and it consists of the constructions, combinations and arrangements herein described and claimed.

An object of the invention is to provide a demountable automobile tire which is intended primarily to be used as an emergency tire in such event as the injury to the regular pneumatic tire to an extent that it becomes necessary or desirable to take it off completely.

A further object of the invention is to provide an emergency automobile tire which is to be used in cases where it becomes necessary to remove the pneumatic tire, the use of the emergency tire obviating the necessity of "riding on the rim" as is often the custom.

Other objects and advantages will appear in the following specification, reference being had to the accompanying drawings, in which:

Fig. 1 is a side elevation showing the improved demountable emergency tire assembled on an automobile wheel, Fig. 2 is a cross section showing the emergency tire in place on the rim of said wheel, the spokes and hub being omitted, Fig. 3 is a side elevation of the emergency tire alone and illustrating how the two tire sections and rim may be disassembled, Fig. 4 is a cross section taken on the line 4—4 of Fig. 3, and Fig. 5 is a detail longitudinal section of a portion of the emergency tire showing the relation of the rim when the lugs are screwed back to an open position.

In carrying out the invention, provision is made of a wooden felly 1 which is of a cross sectional shape substantially as shown in Fig. 4. The felly is made in a number of sections, Fig. 3 illustrating two sections which are respectively designated 2 and 3. The sections may be taken apart should it ever become necessary to disassemble the emergency tire.

An iron or other metallic band 4 is fitted on the outer surface of the felly 1, the felly being recessed at 5 so that the band may fit flush with the surface of the felly. The purpose of the iron band is to reinforce the wood felly so that it will not break or split.

Situated at regular intervals along the felly are metal sockets 6 which are flared at the outer edge as shown at 7, in order to hold them in position. The flared ends 7 are situated inside of the iron band 4, it being necessary to countersink the holes 8 in the felly 1 in which the sockets are inserted, so as to properly receive the flared part 7.

This arrangement serves to hold the sockets firmly in position. The sockets 6 are smooth on the inside. The holes 9 in the band 4 through which the bolts 10 pass are also smooth.

There is one bolt for each of the sockets 6 and the bolts assume radial positions, as clearly shown in Figs. 1 and 3. The outer ends of the bolts carry broad V-shaped lugs 11 in which correspondingly shaped portions of a metallic rim 12 rest. The rim 12 may be made of iron, steel, or any other suitable metal, but it is a purpose of the invention to make the rim of steel. Radial adjustments of the bolts 10 are made by nuts 13 which are locked in position by other and smaller nuts 14. By adjusting the bolts 10 outwardly, the lugs 11 may be made to firmly engage the rim 12 so as to hold it rigidly. This particular arrangement is shown in Fig. 1. By adjusting the bolts 10 inwardly, the rim 12 becomes loose so that it may be taken off and the sections 2 and 3 disassembled. This arrangement is shown in Fig. 3.

Screws 15 are used to fasten the band 4 on the felly 1. The felly 1 is intended to be fitted on the automobile wheel rim 16 in the manner shown in Figs. 1 and 2. The felly 1 carries the rim 16. It is virtually a part of the emergency tire, and when mounted on a tire carrier the emergency wheel has the appearance of Fig. 1, the only exception being that the spokes, hub, etc., of the automobile wheel would not show. Fig. 1 shows the emergency tire in place on an automobile wheel.

The operation of the emergency automobile tire may be briefly described as follows: The reader must consider the rim 16, felly 1 and outer metal rim 12 as being practically one, in other words, the emergency tire. The tire is carried on the motor vehicle in place of the usual spare tire. The manner in which it is carried is immaterial, but it is carried assembled and in readiness to be fitted on an automobile wheel in place of a blown out or otherwise impaired pneumatic tire.

It is not uncommon to see an automobile moving along the street with one, or possibly two, of the pneumatic tires taken completely off and "riding the rims" as it is popularly called. While this practice has the advantage of saving the deflated pneumatic tire from being cut to pieces, it has also the bad effect of damaging the metallic rims so that there is danger of the tire rim not fitting when the time comes to remedy the trouble. It is intended that the emergency tire herein disclosed shall serve as a guard against the so-called "riding the rims" and to this end, the rim 16 (Fig. 2) with its carried parts, is fitted on the wheel in place of the deflated tire and the motorist proceeds as usual.

It is possible to disassemble the emergency tire. The felly 1 is made in two or more sections as shown at 2 and 3 in Fig. 3. The bolts 10 furnish radial support for the metallic rim 12, and these bolts are held in position by nuts 13 and 14. When these nuts are so turned as to cause the ends of the bolts to recede within the sockets, the lugs 11 will be freed from the rim 12. In other words, the lugs are retracted, and it becomes possible to entirely remove the rim as suggested in Fig. 3. The reader is not to understand that the emergency tire is carried in a disassembled condition as Fig. 3 suggests, but on the contrary is carried by the motor vehicle in an assembled condition, in readiness to be placed on a wheel when required.

While the construction and arrangement of the improved emergency tire as herein described and claimed, is that of a generally preferred form, obviously modifications and changes may be made without departing from the spirit of the invention or the scope of the claims.

I claim:—

1. A tire of the character described comprising a felly, a circumferential tread rim cross sectionally V-shaped on the interior and situated in spaced relationship to the felly, sockets permanently seated in the felly, bolts extending from the sockets having means coresponding in shape and engageable with the tread rim at said V-portion, and nuts which are adjustable on the bolts toward the felly to extend said engageable means to increase the pressure against the tread rim and support said rim in position.

2. A tire of the character described comprising a felly having a reinforcing metallic band with a plurality of equi-spaced holes, a socket seated in the felly aligned with each one of the holes and having a flared rim which is engaged by the band for holding the socket in place, a tread rim in circumferential and spaced relationship to the felly, a threaded bolt situated in each socket but having non-threaded engagement therewith, a lug carried by each bolt to engage the rim, and nuts adjustable on the bolts to either extend or retract the bolts in respect to the sockets to thereby either tighten or loosen the lugs in respect to the rim.

3. A tire of the character described comprising a felloe, a tread rim in circumferentially spaced relationship to the felloe, a plurality of means radially adjustable from the felloe toward the rim, and correspondingly shaped means on said adjustable means and the rim arranged to engage and thereby prevent turning of said adjustable means.

LEWIS KENNETH McCLELLAN.